March 26, 1968     H. B. SCHULTZ     3,375,035
FOLDABLE TRAILER

Filed Nov. 26, 1965     4 Sheets-Sheet 1

INVENTOR.
HAROLD B. SCHULTZ
BY
ATTORNEY

March 26, 1968  H. B. SCHULTZ  3,375,035
FOLDABLE TRAILER

Filed Nov. 26, 1965  4 Sheets-Sheet 2

INVENTOR.
HAROLD B. SCHULTZ
BY M A Hobbs
ATTORNEY

INVENTOR.
HAROLD B. SCHULTZ
BY M. A. Hobbs
ATTORNEY

March 26, 1968  H. B. SCHULTZ  3,375,035
FOLDABLE TRAILER

Filed Nov. 26, 1965  4 Sheets-Sheet 4

INVENTOR.
HAROLD B. SCHULTZ
BY  M. A. Hobbs
ATTORNEY

United States Patent Office 3,375,035
Patented Mar. 26, 1968

3,375,035
FOLDABLE TRAILER
Harold B. Schultz, 1820 E. Colfax,
South Bend, Ind. 46617
Filed Nov. 26, 1965, Ser. No. 509,985
5 Claims. (Cl. 296—27)

ABSTRACT OF THE DISCLOSURE

A trailer having a body, a top adapted to be raised from and lowered onto the body. Walls are pivoted to the upper edges of the body, and a spring means including torsion bars is used to assist in raising the pivoted walls when the top is raised. In practice, the pivoted walls would normally be the end walls of the trailer.

In recent years camping trailers which have become extensively used consist of a body of rigid walls forming the lower portion of the trailer and an elevatable top resting on the body when the trailer is folded and being supported on expandable side walls or posts when the trailer is in its unfolded position. The top and the side walls of the body are normally of rigid construction, and the space between the top of the body side walls and the lower edge of the top is enclosed either with flexible material such as canvas or with rigid side walls foldable inwardly beneath the top when the top is lowered. The trailers with the flexible side walls are easy to assemble and can be folded and unfolded with little force, but those with the rigid side walls have in the past required the side walls to be in several sections or required the use of complicated mechanisms to raise and lower the sides to eliminate excessive force and labor in folding and unfolding the trailer. These latter types of foldable trailers have not been satisfactory in that the mechanism is either too expensive or too bulky for the camping trailer trade, or the outside wall structure does not have a pleasing appearance. It is therefore one of the principal objects of the present invention to provide a folding trailer having sides and/or ends of rigid panel construction foldable inwardly and downwardly into or over the body and being so constructed and arranged that it can be easily and quickly lowered and raised between folded and unfolded positions, with the use of little force or effort.

Another object of the invention is to provide a camping trailer or the like, having rigid end walls supporting the top when the trailer is in its expanded position, which can easily be moved to the top supporting position by a one-man operation in which each end of the top is lifted separately and the respective end walls readily pulled thereunder in a simple, easily executed maneuver.

Still another object of the invention is to provide a foldable trailer having single panel side and end walls foldable inwardly, which when folded are completely enclosed and when unfolded have the pleasing appearance of a continuous side and end wall construction, and which can be easily manipulated to convert the structure between its folded and unfolded positions.

A further object is to provide a vehicle of the aforesaid type which is simple in construction and operation, and which is relatively spacious for comfortable living when unfolded and compact when folded for satisfactory and safe roadability.

Additional objects and advantages of the invention will become apparent from the following description and accompanying drawings, wherein.

Figure 1:
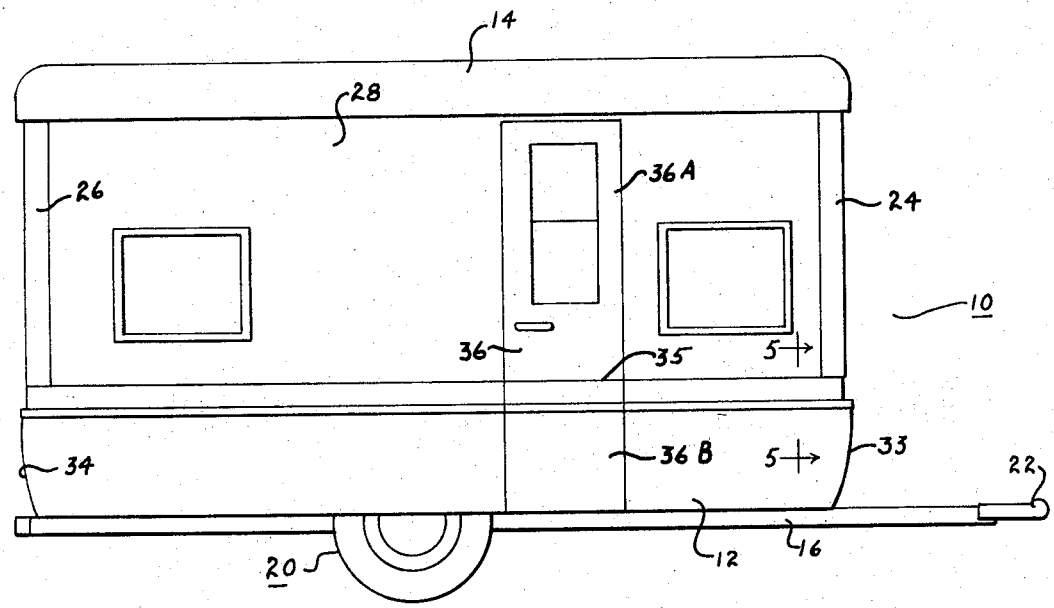
FIGURE 1 is a side elevational view of a foldable camping trailer having incorporated therein the present invention and showing the trailer in its unfolded position.
Figure 2:
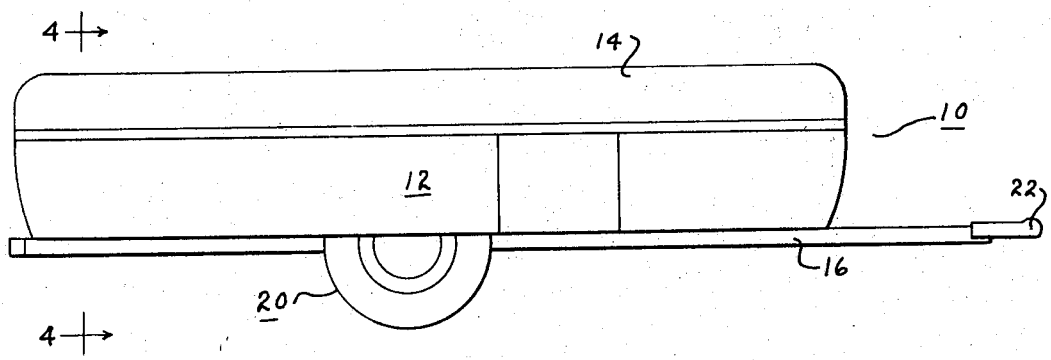
FIGURE 2 is a side elevational view of the trailer shown in FIGURE 1, showing the trailer in its folded position.

Referring more specifically to the drawings and to FIGURES 1 and 2 in particular, numeral 10 designates generally the present camping trailer, 12 the trailer body, 14 the trailer top, 16 the frame and 20 the undercarriage, including a conventional axle and two wheels connected to the frame by a suitable spring structure. The frame extends forwardly from the trailer body and includes a htich 22 for connecting the trailer to a towing vehicle. The construction of the foregoing conventional parts and structure are not important to a full understanding of the present invention, and hence will not be described in detail herein.

As illustrated in the drawings, the trailer is folded to the position illustrated in FIGURE 2 with top 14 resting on the upper part of body 12, and is unfolded to the position shown in FIGURE 1 with top 14 held in an elevated position by forward and rearward end walls 24 and 26. The side walls 28 and 30, while not directly supporting the top, give stability to the structure when the trailer is unfolded. The side and end walls are of rigid panel-like construction pivotally connected by hinged of suitable construction along the upper edge of the side walls 31 and 32 and end walls 33 and 34 of body 12. In the embodiment shown, the ends of the top seat on shoulders 33a and 34a of end walls 33 and 34 and on strips 31a and 32a along sides 31 and 32, respectively. The shoulders may, however, extend completely around the body, or the top may seat on the upper edges of the body side walls. The body side wall 28 contains a door 36 divided along line 35 to permit the door to fold inwardly along with side wall 28, thus dividing the door into an upper section 36A and a lower section 36B, each hinged to the respective side wall but connected when side wall 28 is in its unfolded position to form a single door. The particular construction of the side and end walls is not important, but normally would consist of frame members 40 having an external wall 42 and internal wall 44 attached to the respective sides of frame members 40, thus providing a thermal space between the two walls which may contain insulation and the electrical wiring for the trailer.

Figure 3:
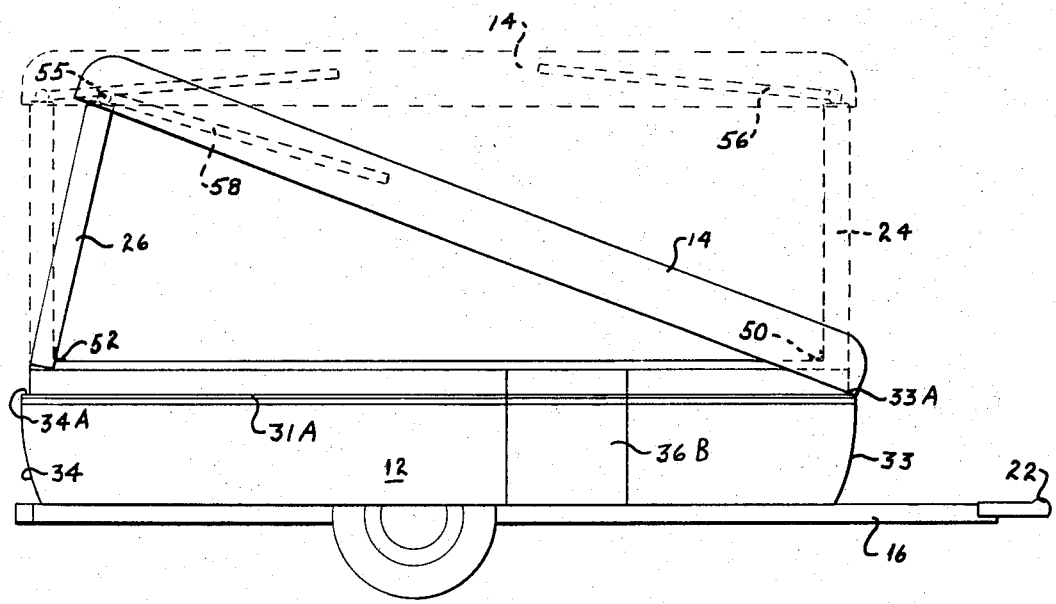
FIGURE 3 is a side elevational view of the trailer shown in the preceding figures illustrating the manner in which the trailer is folded and unfolded.
Figure 4:
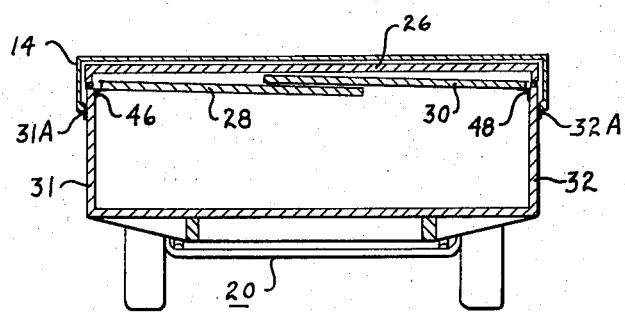
FIGURE 4 is a vertical cross sectional view of the present trailer in folded position, the section being taken on line 4—4 of FIGURE 2.
Figure 5:
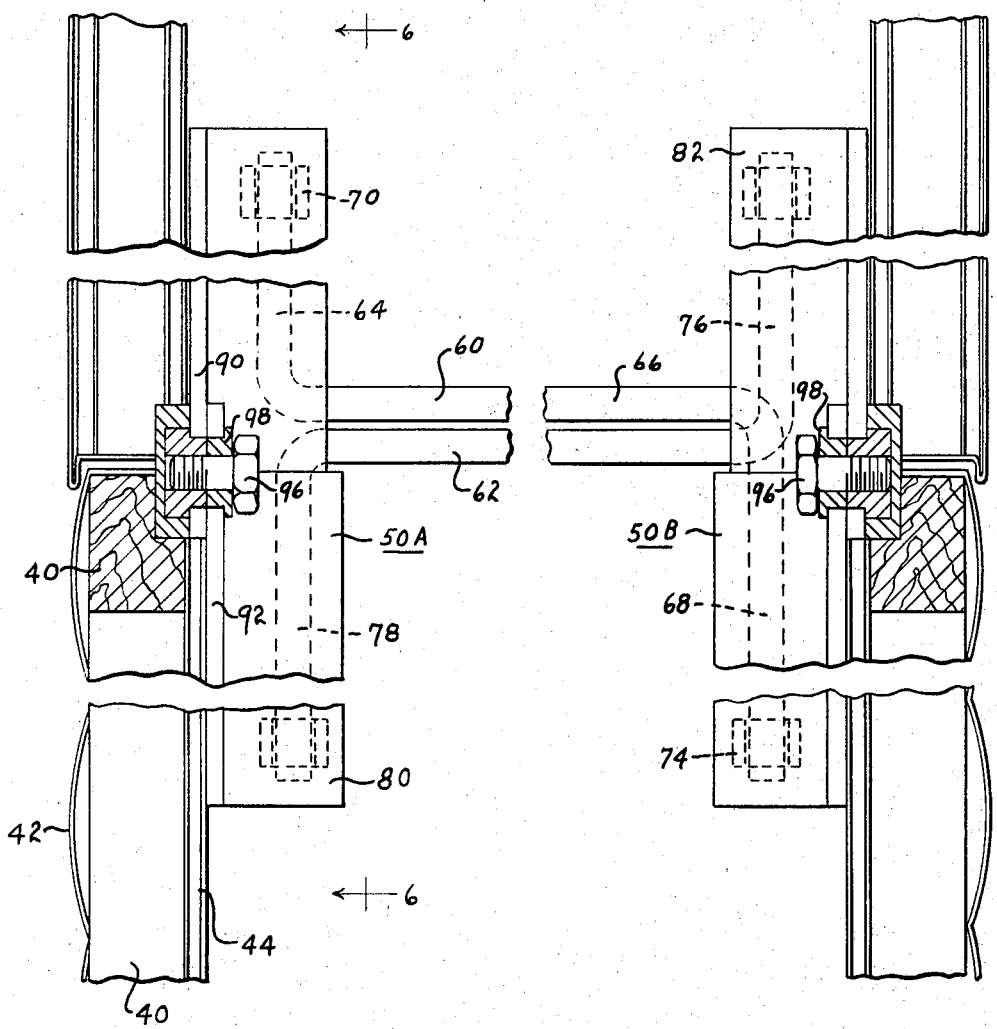
FIGURE 5 is an enlarged fragmentary cross sectional view of a portion of the present trailer, the section being taken on line 5—5 of FIGURE 1, showing the end wall construction and the operating mechanism therefor, with the end wall in its unfolded position.
Figures 6, 7:
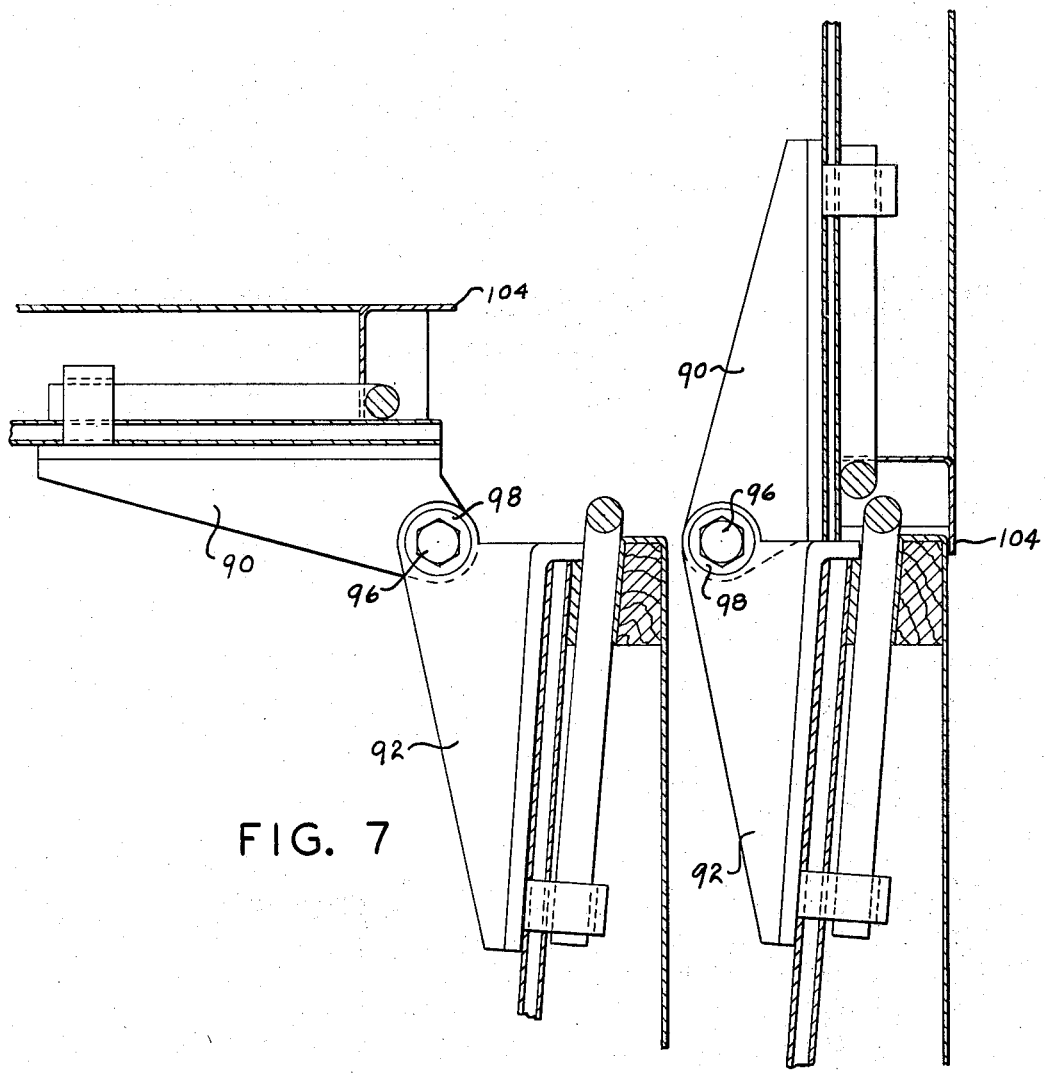
FIGURE 6 is an enlarged fragmentary vertical cross sectional view of the operating mechanism shown in FIGURE 5, the section being taken on line 6—6 of the latter figure.
FIGURE 7 is a vertical cross sectional view similar to that shown in FIGURE 6, showing the structure in its folded position.

The trailer is folded by first folding side walls 28 and 30 inwardly along hinges 46 and 48 to a substantially horizontal and overlapping position, as illustrated in FIGURE 4. With the side walls folded inwardly in this manner, the top is supported entirely by the end walls 24 and 26. In lowering the top, either end wall 24 or 26 is lowered by pivoting it downward at hinges 50 and 52 while sliding the upper end of the end wall inwardly on track along the inner side of each end of the top. A roller or other suitable sliding means 55 is disposed in the respective tracks 56 and 58 and guides the end walls, while the walls are being raised and lowered. When one end wall is to be lowered, the operator merely relieves the weight of the respective end of the top from the upper end of the end wall and presses the end wall inwardly and downwardly while permitting the top to move from the position illustrated in broken lines in FIGURE 3 to the position illustrated in full lines at the forward end of the trailer. The same operation is performed in lowering the other rear end.

One of the principal features of the present invention is a mechanism which assists the operator in raising and lowering the two end walls 24 and 26 and the respective ends of top 14. This mechanism basically consists of two torsion bars 60 and 62 operating, for example, between end wall 33 of body 12 and foldable end wall 24, and for the purpose of the present description, only the mechanism in the forward end of the trailer will be described, since the rear mechanism for operating rear wall 26 is the same as that in the forward end. Rod 60 is provided with an upwardly extending arm 64 extending at right angles to horizontal main portion 66, and a downwardly extending arm 68 extending at right angles to portion 66. Arm 64 is secured to hinge 50A by a bracket 70 which in turn is secured to the end wall by a plurality of screws or other suitable securing means extending through end wall 24 into a frame member thereof. Arm 68 is secured to hinge 50B by a bracket 74 which in turn is secured to end wall 33 of the body on the internal side thereof by screws or other suitable securing means extending through the hinge part and end wall into a frame member thereof. Torsion bar 62 is likewise provided with upwardly and downwardly extending arms 76 and 78 secured to the lower and upper parts 80 and 82 of hinges 50A and 50B, respectively, by brackets. It is thus seen that arms 64 and 68 of torsion bar 60, and arms 76 and 78 of torsion bar 62 are held firmly to the respective upper and lower hinge parts and wall sections.

In the embodiment of the invention illustrated in the drawings, hinges 50A and 50B consisting of the upper and lower hinge parts have overlapping pivoted parts 90 and 92 connected to one another by a bolt 96 extending through the overlapping parts and having a threaded sleeve on the end thereof for holding the two hinge parts, and a bushing 98 in position for relative rotation of the two hinge members thereon. The two hinges 50A and 50B are identical in construction, and hence the foregoing details in construction are given like numbers herein. The torsion bars 60 and 62 are offset from the axis of the pivot points of hinges 50A and 50B and, in the structure illustrated in the drawings, the torsion bars are enclosed in the end walls and hence are concealed when the foldable end walls 24 and 26 are in their unfolded position. However, in some installations, it may be desirable or convenient to place the torsion bars on the internal side of the end walls rather than within them, and this change may be made with only slight modification in the torsion bar and hinge structural relationship. When the side and end walls are in their elevated positions, flanges 104 or other sealing means on the foldable side or end walls extend downwardly over the upper edge of the respective body side walls when the sides and ends are uprighted, thus forming an effective closure or seal between the two side wall or end wall sections.

The torsion bars are under sufficient tension to resist the downward movement of walls 24 and 26 to prevent the walls from dropping inwardly when being folded, and are preferably under sufficient tension to require the operator to press mildly inwardly as the top is lowered. When the top is raised, one end of the top is lifted and the torsion bars automatically cause the respective end wall to be raised to its vertical position. While variations in the tension may be made, it is preferable that sufficient tension be placed on the torsion bars to cause the end wall to be raised either automatically or without the application of any substantial force by the operator, and the torsion bars may apply a force sufficient to partially lift or to assist in the lifting of the top, as well as perform the entire lifting operation of the end walls. It is seen that the present mechanism for assisting in the raising and lowering of the top and end walls is relatively simple and compact, and can be mounted effectively in the relatively small spaced provided near the end walls of the trailer. Further, the torsion mechanism may be used on the sides, as well as on the ends, or in place of those mechanisms at the end walls if the side walls are interchanged with the end walls as supports for the top.

When the present trailer is to be folded from the position shown in FIGURE 1 to the position shown in FIGURE 2, the operator releases the two side walls and folds them inwardly, leaving the upper door section open, and stands directly in front of the door to direct the downward movement of the two side walls. After the two side walls have been folded inwardly, the operator then moves either the forward or rear wall downwardly by releasing a latch at the upper end of the end wall and relieving the weight of the top on the end wall, and then pressing the end wall inwardly and downwardly, thus permitting the top to fold to the position illustrated in FIGURE 3. The same operation is performed on the other end wall, thereby permitting the top to move to the position illustrated in FIGURE 2, completely enclosing the two side and end walls therein. In unfolding the trailer, the operator first lifts one end of the top and raises the respective end wall or permits it to rise automatically, depending upon the amount of tension on the two torsion bars 60 and 62, and then performs the same operation at the opposite end. The two sides are thereafter raised and latched in place, thus completing the unfolding operation.

The foregoing structure may be combined with various other types of foldable conveniences, such as tables, beds and benches, which fold completely within the confines of body 12. While only one embodiment of the present invention has been described in detail herein, various changes and modifications may be made to satisfy requirements without departing from the scope of the invention.

I claim:

1. In a trailer having a body with side and end walls and a top movable from a position on said body to an elevated position thereabove, the construction comprising a wall pivoted to a wall of said body and movable inwardly and downwardly beneath said top, said pivoted wall forming a support for the top when said top is in its elevated position, and a yieldable means connected to said pivoted wall and including a torsion bar having an arm at each end at right angles thereto, with one of said arms connected to said body wall and the other of said arms connected to said pivoted wall, and hinge means interconnecting said body wall and pivoted wall at each end of said torsion bar.

2. The construction defined in claim 1, in which said pivoted wall is an end wall of the trailer.

3. The construction defined in claim 1, in which said bar extends substantially the full length of said pivoted wall.

4. The construction defined in claim 1, in which said yieldable means includes two substantially parallel torsion bars, each having one end connected to said body wall and the other end connected to said pivoted wall.

5. The construction defined in claim 6, in which the respective arms of said bars engage the opposed pivoted members of each hinge means for applying a force to said pivoted wall for urging said wall upwardly and outwardly.

References Cited

UNITED STATES PATENTS

| | | | |
|---|---|---|---|
| 3,048,438 | 8/1962 | Koch | 296—27 |
| 3,273,934 | 9/1966 | Hagenson | 291—96 |

BENJAMIN HERSH, Primary Examiner.

P. GOODMAN, Assistant Examiner.